(12) United States Patent
Fleury et al.

(10) Patent No.: US 9,623,728 B2
(45) Date of Patent: Apr. 18, 2017

(54) DRIVING ASSISTANCE DEVICE AND DRIVING ASSISTANCE METHOD

(71) Applicant: Valeo Vision, Bobigny (FR)

(72) Inventors: Benoist Fleury, Vincennes (FR); David Hue, Butry sur Oise (FR); Kostadin Beev, Emerainville (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 15/022,739

(22) PCT Filed: Sep. 23, 2014

(86) PCT No.: PCT/EP2014/070268
§ 371 (c)(1),
(2) Date: Mar. 17, 2016

(87) PCT Pub. No.: WO2015/044146
PCT Pub. Date: Apr. 2, 2015

(65) Prior Publication Data
US 2016/0229268 A1    Aug. 11, 2016

(30) Foreign Application Priority Data
Sep. 26, 2013   (FR) ..................... 13 59279

(51) Int. Cl.
*B60Q 1/14*     (2006.01)
*B60J 3/04*     (2006.01)
*G02C 7/10*     (2006.01)
*G02F 1/01*     (2006.01)

(52) U.S. Cl.
CPC ............... *B60J 3/04* (2013.01); *B60Q 1/143* (2013.01); *G02C 7/101* (2013.01); *G02F 1/0121* (2013.01); *B60Q 2300/314* (2013.01); *Y02T 10/88* (2013.01)

(58) Field of Classification Search
CPC ........................................ B60R 1/00
USPC ............... 315/76, 77, 149; 359/601, 602
See application file for complete search history.

(56) References Cited

U.S. PATENT DOCUMENTS

| | | | |
|---|---|---|---|
| 3,199,114 A * | 8/1965 | Malifaud | B60J 3/02 296/97.2 |
| 4,286,308 A | 8/1981 | Wolff | |
| 5,486,938 A * | 1/1996 | Aigrain | B60Q 1/14 349/116 |
| 7,970,172 B1 | 6/2011 | Hendrickson | |
| 9,186,963 B2 | 11/2015 | Tewari et al. | |

(Continued)

FOREIGN PATENT DOCUMENTS

DE   102012008913 A1   11/2012

*Primary Examiner* — Thuy Vinh Tran
(74) *Attorney, Agent, or Firm* — Jacox, Meckstroth & Jenkins

(57) ABSTRACT

A device for assisting with driving an automotive vehicle comprising a variable transmission screen intended to be placed between a road scene (SR) and a driver of the vehicle, the assisting device being configured to, when active, control a transmission coefficient of the variable transmission screen. The device comprises a glare sensor and is furthermore configured to modify the coefficient of transparency of the variable transmission screen depending on the glare measured by the glare sensor. In addition, a method for assisting with driving the automotive vehicle is included.

16 Claims, 2 Drawing Sheets

(56) References Cited

U.S. PATENT DOCUMENTS

2012/0126099 A1 5/2012 Tewari et al.
2014/0153076 A1 6/2014 Tewari et al.

* cited by examiner

DRIVING ASSISTANCE DEVICE AND DRIVING ASSISTANCE METHOD

CROSS-REFERENCE TO RELATED APPLICATIONS

This application is the U.S. National Phase application of PCT Application No. PCT/EP2014/070268 filed Sep. 23, 2014, which claims priority to the French application 1359279 filed on Sep. 26, 2013, which applications are incorporated herein by reference and made a part hereof.

BACKGROUND OF THE INVENTION

1. Field of the Invention

The invention relates to a device for assisting with driving an automotive vehicle. The invention also relates to a method for assisting with driving an automotive vehicle.

2. Description of the Related Art

The present invention relates to methods and devices that are intended to provide assistance with driving automotive vehicles, when exterior luminosity is low and requires lights to be turned on, but also when exterior luminosity is high.

When exterior luminosity is low, it is known to use light beams to illuminate the road scene. The light beams emitted by the illuminating devices with which vehicles are equipped are regulated by international regulations that set maximum and minimum allowable intensities, for example on a screen placed away from and on the axis of the illuminating device. These regulations have the aim of ensuring simultaneously that:

the illuminating device of the vehicle equipped therewith satisfactorily illuminates the road scene toward which the driver is driving, so that he is able to apprehend his environment under the best possible conditions, and that the drivers of other vehicles are not dazzled, whether they are driving in the opposite direction (oncoming vehicles) or in the same direction (vehicles in front).

With the aim of meeting these regulatory aims and with a view to improving the comfort and safety of the driver, a plurality of solutions have been proposed. One thereof consists in using a device for assisting with driving composed of a pulsed illumination source synchronized with a variable transmission screen, in such a way that the illumination reaches its maximum value when the transmission coefficient of the variable transmission screen reaches its maximum value, i.e. a maximum transparency, and in such a way that the illumination reaches its minimum value when the transmission coefficient of the variable transmission screen reaches its minimum value, i.e. a minimum transparency.

Thus, by virtue of this synchronization, the driver benefits completely from his lights, while decreasing the risk of being dazzled by exterior light sources, because the vision of the driver is greatly restricted when the transparency of the variable transmission screen is at its minimum.

Furthermore, the pulsed illumination does not dazzle the drivers of other vehicles since they perceive only an average illumination that is set to meet the aforementioned regulations.

Nevertheless, one disadvantage of this solution is that it makes it more difficult for the driver to see the luminosity of any exterior light source that is not however responsible for dazzle, such as public lighting, the lights of other vehicles located sufficiently far away to not be dazzling, traffic lights, etc. In particular for the lights of other vehicles, such a solution may lead to the loss of or at the very least limit the perception of speed or path that these lights enable, when they are not turned off.

In addition, using a pulsed illumination source requires more electrical power to be delivered, for the same average illumination, than is required with an unpulsed illumination source because of the decrease in the efficiency of the light sources when they are pulsed with higher currents (in the current state of the art).

Likewise, when luminosity is high, it is possible for glare effects to be encountered, which it would be desirable to treat.

SUMMARY OF THE INVENTION

The invention aims to mitigate at least certain of the drawbacks of these known devices for assisting with driving.

In particular, the invention aims to provide, in at least one embodiment of the invention, a device and method for assisting with driving that allow dazzle to be avoided, both day and night, while preserving, as best as possible, the luminosity originating from non-dazzling exterior sources.

The invention also aims to provide, in at least one embodiment of the invention, a device and method for assisting with driving that allow the consumption of the electrical current required by the system to be optimized.

To do this, the invention relates to a device for assisting with driving an automotive vehicle comprising a variable transmission screen intended to be placed between a road scene and a driver of the vehicle, the assisting device being configured to, when active, control a transmission coefficient of the variable transmission screen, wherein the assisting device comprises a means for evaluating and especially measuring glare, and is furthermore configured to modify a coefficient of transparency of the variable transmission screen depending on the glare measured by the glare-evaluating means. The glare-evaluating means is in particular a glare sensor.

An assisting device according to the invention therefore allows the transparency of the variable transmission screen to be adapted to the glare actually measured by the glare-evaluating means and thus exterior luminosity not to be permanently decreased if the driver is not actually being dazzled.

Advantageously and according to the invention, the vehicle being equipped with at least one illuminating device able to emit a beam for illuminating the road scene in front of the vehicle, the assisting device is configured to, when active, control a light emission of at least one light source of the illuminating device and the transmission coefficient of the variable transmission screen, in relation to each other, with a pulsed signal.

According to this aspect of the invention, the assisting device thus controls with a pulsed signal the illumination source of the vehicle (night-time driving) and the transmission coefficient of the variable transmission screen, in order to improve the vision of the driver without dazzling the drivers of other vehicles.

Advantageously and according to the invention, the assisting device is configured to, when active, control the light emission with a first periodic pulsed signal of period T and duty cycle R1 and the transmission coefficient of the variable transmission screen with a second periodic pulsed signal of period T and duty cycle R2, the device being configured to modify the coefficient of transparency of the variable transmission screen by modifying the second pulsed signal so that the duty cycle R2 takes a value between:
  its maximum when the glare measured by the glare-evaluating means is below a first threshold, and
  R1 when the glare measured by the glare-evaluating means is above a second threshold.

The expression "duty cycle" is understood to mean the value equal to t/T, t corresponding to the time for which the value of the pulsed signal is at the maximum, and T to the period of the pulsed signal.

According to this aspect of the invention, the transparency of the variable transmission screen is at its maximum when there is no or little glare, in order not to decrease the exterior luminosity, and the second pulsed signal has the same duty cycle as the first pulsed signal when glare is maximum, in order to decrease this glare while benefiting completely from the illumination generated by the illuminating device.

According to a first embodiment of the invention, the assisting device is configured to keep the duty cycle R1 constant whatever the value of the duty cycle R2.

According to another embodiment of the invention, the assisting device is configured to modify the control of the light emission by modifying the first pulsed signal so that the duty cycle R1 takes a value between:
  its maximum when the glare measured by the glare-evaluating means is below a third threshold, and
  its minimum when the glare measured by the glare-evaluating means is above a fourth threshold.

The expression "its minimum" is here understood to mean the lowest duty cycle R1 value for which the illumination is still sufficiently bright especially to meet the various regulations, and not a duty cycle close to 0.

Advantageously, the maximum value of the duty cycle R1 must not exceed the value of the duty cycle R2 so as to avoid decreasing the driver's perception of the pulsed illumination.

Advantageously and according to the invention, R1 takes values identical to R2.

Advantageously and according to the invention, the assisting device is configured to modify the control of the light emission by modifying the amplitude of the first pulsed signal.

According to this aspect of the invention, the device may adjust the power of the light emission in order to decrease the power used and thus optimize the consumption of the electric current required by the system and avoid high current values.

Advantageously and according to the invention, the assisting device is configured to modify the control of the light emission by modifying the amplitude of the first pulsed signal so that the average illumination generated by the light emission during the period T is constant when the duty cycle R1 varies.

According to this aspect of the invention, the light-emitting device illuminates the road with a constant average illumination in order to meet regulatory requirements.

Advantageously and according to the invention, the assisting device comprises a luminosity sensor and the assisting device is configured to adapt the glare thresholds to the measured luminosity.

According to this aspect of the invention, the assisting device makes use of the luminosity measured by the luminosity sensor to determine the glare thresholds, because a given measurement by the glare-evaluating means does not necessarily correspond to the same glare perceived by the driver, depending on the ambient luminosity measured by the luminosity sensor.

Advantageously and according to the invention, the glare-evaluating means is a luminosity sensor the measurements of which are processed in order to deduce the glare therefrom.

Advantageously and according to the invention, the variable transmission screen is formed:
  by the windshield of the vehicle,
  by a screen placed between the windshield of the vehicle and the driver of the vehicle, or
  by a pair of glasses worn by the driver of the vehicle.

Advantageously and according to the invention, the variable transmission screen is formed by a pair of glasses worn by the driver of the vehicle, and in that the glare-evaluating means is placed on the pair of glasses.

According to this aspect of the invention, the glare-evaluating means is placed as close as possible to the eyes of the driver, and therefore the measured glare is similar to the glare actually perceived by the driver.

This fitting glare measurement may also be achieved by integrating the glare-evaluating means into the windshield of the vehicle, near the interior rear-view mirror for example.

The invention also relates to a pair of glasses for the assisting device according to the invention.

The invention also relates to a method for assisting with driving an automotive vehicle, the vehicle being equipped with a variable transmission screen intended to be placed between the road scene and a driver of the vehicle, the method comprising a step of controlling a transmission coefficient of the variable transmission screen with a pulsed signal, wherein the method contains a step of modifying the coefficient of transparency of the variable transmission screen depending on the glare measured by a glare-evaluating means.

The method according to the invention therefore allows the transparency of the variable transmission screen to be adapted to the glare actually measured by the glare-evaluating means and thus exterior luminosity not to be permanently decreased if the driver is not actually being dazzled.

Advantageously and according to the invention, the vehicle being equipped with at least one illuminating device able to emit a beam for illuminating a road scene in front of the vehicle, the controlling step is configured to allow a light emission of at least one light source of the illuminating device and the transmission coefficient to be controlled in relation to each other.

Advantageously and according to the invention, the light emission being controlled with a first periodic pulsed signal of period T and duty cycle R1 and the transmission coefficient of the variable transmission screen with a second periodic pulsed signal of period T and duty cycle R2, the step of modifying the coefficient of transparency of the variable transmission screen comprises a step of modifying the second pulsed signal, so that the duty cycle R2 takes a value between:
  its maximum when the glare measured by the glare-evaluating means is below a first threshold, and
  R1 when the glare measured by the glare-evaluating means is above a second threshold.

According to a first embodiment of the invention, the duty cycle R1 is kept constant whatever the value of the duty cycle R2.

According to another embodiment of the invention, the method comprises a step of modifying the control of the light emission by modifying the amplitude of the first pulsed signal.

Advantageously and according to the invention, the light emission is controlled by modifying the amplitude of the first pulsed signal so that the average illumination generated by the light emission during the period T is constant when the duty cycle R1 varies.

Advantageously and according to the invention, the method according to the invention is implemented by the device according to the invention.

Advantageously and according to the invention, the device according to the invention employs the device according to the invention.

The invention also relates to an assisting device and an assisting method that are characterized in combination by all or some of the features mentioned above or below.

These and other objects and advantages of the invention will be apparent from the following description, the accompanying drawings and the appended claims.

BRIEF DESCRIPTION OF THE ACCOMPANYING DRAWINGS

Other aims, features and advantages of the invention will become apparent on reading the following solely nonlimiting description given with reference to the appended figures, in which.

DETAILED DESCRIPTION OF THE PREFERRED EMBODIMENTS

Figure 1:
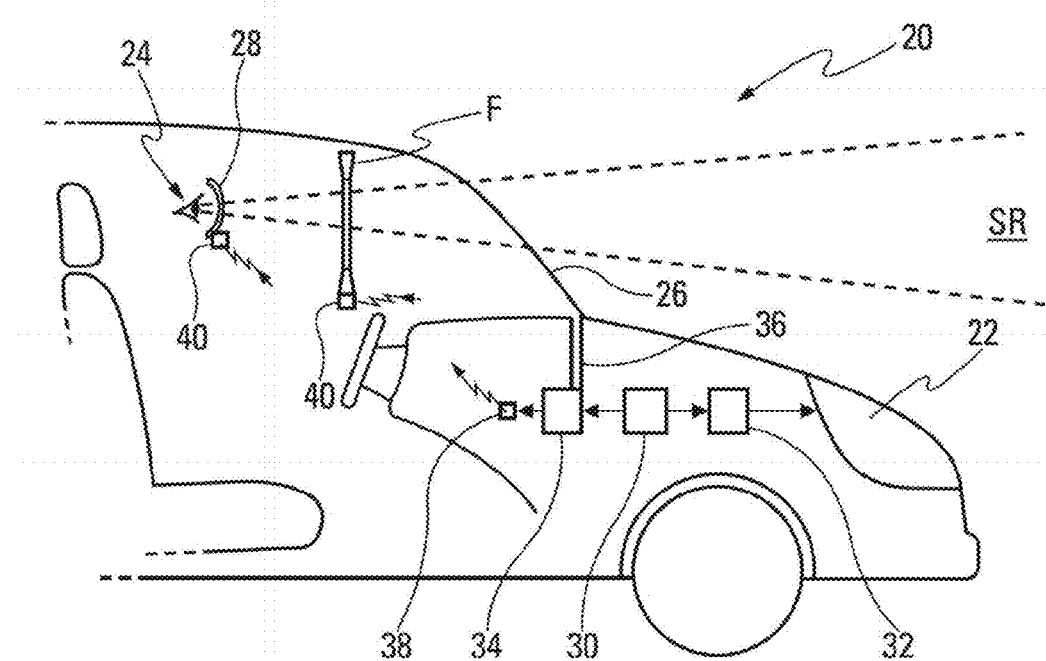
FIG. 1 is a schematic partial cross-sectional view of a vehicle comprising a device according to one embodiment of the invention.

FIG. 1 schematically shows a partial cross section through a vehicle 20 comprising an assisting device according to one embodiment of the invention. The vehicle 20 is, as is conventional, equipped with an illuminating device 22 able to emit a beam for illuminating a road scene SR by virtue of a light source, and is controlled by a driver 24, symbolized by his eye. The road scene SR corresponds to what the driver 24 of the vehicle 20 observes. The driver 24 here observes the road scene SR in front of the vehicle 20 and through the windshield 26.

A variable transmission screen is placed in the field of view of the driver 24, between the latter and the road scene SR. According to various embodiments of the invention, the variable transmission screen may consist:

- of an actual screen F placed between the driver 24 and the windshield 26, for example able to be raised in the same way as a sun visor,
- of the windshield 26 itself, or
- of a pair of glasses 28 worn by the driver 24 in a similar way to sunglasses or corrective spectacles, a single lens having been shown in FIG. 1.

These three embodiments have all been shown in FIG. 1, for ease of illustration. They are however only variant embodiments, each of them tending to obtain the same result. In the rest of the description, the term "variable transmission screen" will be used to designate any one of these three embodiments.

Whatever the embodiment, the assisting device, when it is active (i.e. in operation), controls a transmission coefficient of the variable transmission screen F, 26, 28 and the light source of the illuminating device 22 of the vehicle 20, in relation to each other. In particular, in the case of glare, the controlling is synchronized. The objective to be achieved thereby is for the transmission coefficient of the variable transmission screen F, 26, 28 to be maximum (i.e. for the transparency of the screen to be maximum) when the illuminating device 22 is emitting light, and therefore for the driver 24 to be able to see the road scene SR illuminated by the illuminating device 22.

To do this, the device here comprises a control unit 30 that generates the pulsed signals intended for controlling the illuminating device 22 and the variable transmission screen F, 26, 28.

The control unit 30 will possibly be connected to a management circuit 32 that controls the power supply of the illuminating device 22 so that the illuminating device 22 emits a beam of an intensity that varies periodically between a maximum value and a minimum value, varying depending on the first pulsed signal.

The control unit 30 will possibly also be connected to a circuit 34 controlling the transmission coefficient, for the transmission of the second pulsed signal. The supply of electrical power and control signals is represented in FIG. 1 by the double link 36. If the variable transmission screen F, 26, 28 is movable or remote from the control unit 30 (in the case of use of a pair of glasses 28 for example), the pulsed signal may be transmitted via a wireless link, using a given wireless communication protocol, such as, for example, a protocol according to the standard IEEE 802.15.1 and all its extensions (commonly denominated by the registered trademark Bluetooth) or the standard IEEE 802.11 (commonly denominated by the registered trademark Wi-Fi).

If the second pulsed signal is transmitted wirelessly from the control unit 30 to the variable transmission screen F, 26, 28, the circuit 34 controlling the transmission coefficient comprises, for example, an emitter 38 of remote-control waves, and the variable transmission screen F, 26, 28 is provided, for example, with a receiver 40 of the same remote-control waves. The receiver 40 then controls the variable transmission coefficient of the screen, in the sense that it applies to the variable transmission screen F, 26, 28 set controls corresponding to the second pulsed signal.

In the embodiment in which a glare sensor 46 is located for example on the pair of glasses 28, the glare sensor 46 and the control unit 30 will also communicate wirelessly in order to transmit the measurements of the glare sensor 46.

Figure 2:
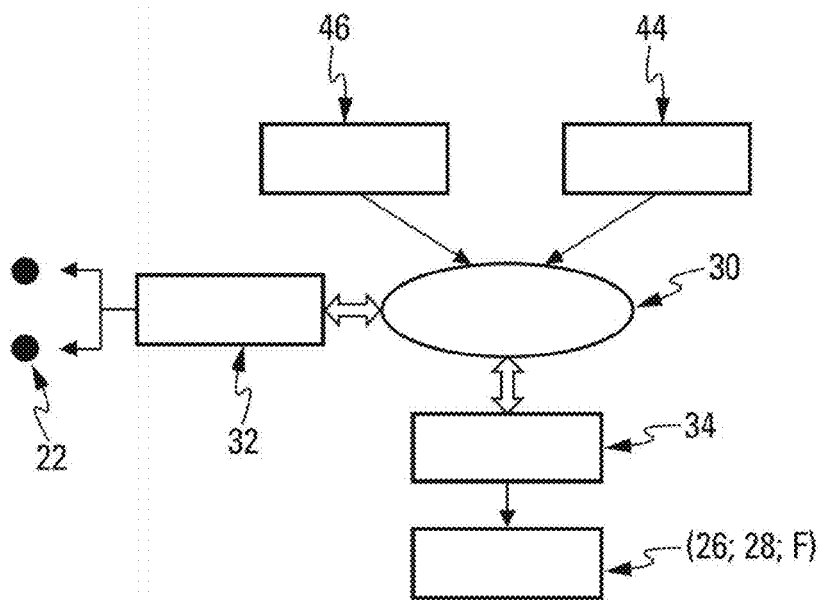
FIG. 2 is a schematic view of the assisting device according to one embodiment of the invention.

FIG. 2 is a schematic view of the assisting device according to one embodiment of the invention. The control unit 30 receives measurement information originating from the glare sensor 46 and from a luminosity sensor 44. The luminosity sensor 44 makes it possible for the control unit 30 to determine the ambient luminosity of the road scene SR and to adapt accordingly the thresholds associated with the glare measurements. Specifically, whether a given light source does or does not cause dazzle depends on the ambient luminosity.

The glare sensor 46 works by virtue of measurements that are then processed to determine whether the driver 24 is indeed dazzled by virtue of methods known to those skilled in the art. For example, it is possible to use the Schmidt-Clausen and Bindels equation and the De Boer scale to evaluate the glare.

The equation developed by Schmidt-Clausen and Bindels is written:

$$W = 5.0 - 2 \log\left( \frac{E}{0.003\left(1 + \sqrt{(L/0.04)} \cdot \phi^{0.46}\right)} \right)$$

In this equation E is a quantity representing the amount of emitted light, namely the illuminance (measured in lux) measured at a given distance from the eye of the driver 24, L is the adaptation luminance (measured in candela per meter squared) and φ is the angle (measured in minutes of arc) between the gaze axis of the driver 24 and the source of the glare.

The W value gives a glare value that is compared to the De Boer scale, which allows the level of discomfort associated with the glare to be determined. The scale contains discrete tiers of W values giving the discomfort associated with the glare:

W=9: just noticeable
W=7: satisfactory
W=5: permissible
W=3: disturbing
W=1: unbearable Intermediate values of the W value give rise to discomfort levels intermediate between these tiers.

Figure 3:
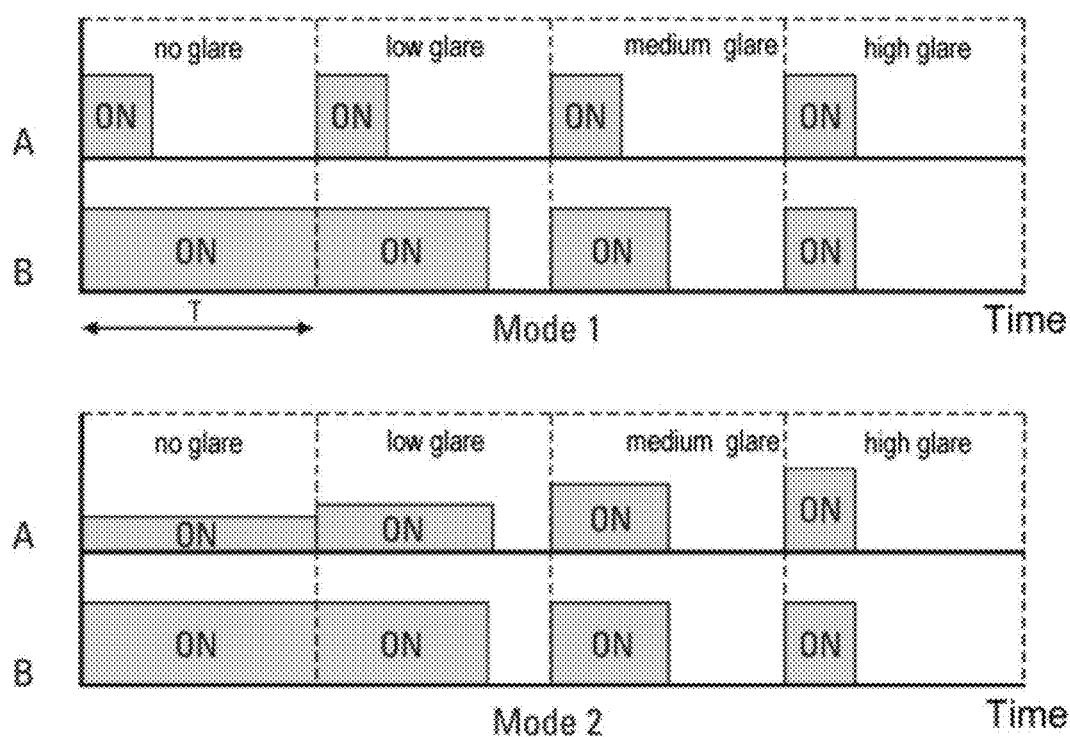
FIG. 3 is a set of graphs showing the pulsed signals during a period T as a function of various glare levels and according to two embodiments.

The assisting device is able to calculate this W value in order to act accordingly to decrease it, by virtue of modifications such as shown in FIG. 3. In addition, the assisting device may be given a W value as a glare objective not to be exceeded and adapt the modifications as a consequence. In particular, the modification of the transparency of the variable transmission screen F, 26, 28 influences the E value of the equation.

According to various embodiments, the glare sensor 46 may be a luminosity sensor the measurements of which are processed in order to deduce the glare therefrom, a camera such as those used in glare-free high beam (GFHB) illuminating devices, or any other means, known to those skilled in the art, for evaluating and especially measuring glare.

FIG. 3 shows graphs of the pulsed signals during a period T as a function of various glare levels and according to two embodiments.

Each graph A and B shows the variation of the pulsed signals that control the illuminating device 22 and the variable transmission screen F, 26, 28, respectively, as a function of time and over an interval corresponding to one period T. Each interval is shown four times, in order to show how the signals vary, during a period T, as a function of various glare levels: "no glare", "low glare", "medium glare" and "high glare", arranged from left to right, respectively. The "no glare" level corresponds to a glare value, as measured by the glare sensor 46, below a first threshold. The "high glare" level corresponds to a glare value, as measured by the glare sensor 46, above a second threshold.

The graph entitled Mode 1 shows an embodiment in which the duty cycle R1 of the first pulsed signal remains constant and in which only the duty cycle R2 of the second pulsed signal varies as a function of the measured glare. The following behavior is then observed:

when there is "no glare", the duty cycle R2 is at its maximum: thus, the transparency of the variable transmission screen F, 26, 28 is at its maximum and the driver 24 benefits completely from his lights and from the exterior luminosity.

when there is "high glare", the duty cycle R2 is equal to the duty cycle R1 and the signals are synchronized, the transparency of the variable transmission screen F, 26, 28 is thus decreased while keeping the transmission coefficient at its maximum when the illuminating device 22 is emitting light: thus, the driver 24 benefits completely from his lights, and his perception of the exterior luminosity is minimized in order to prevent dazzle. The driver 24 will be able to benefit completely from the exterior luminosity again only once the source of glare has disappeared from his field of view.

between these two extreme values, the duty cycle R2 varies gradually and/or in steps between its maximum value and the duty cycle R1, depending on the magnitude of the measured glare.

The graph entitled Mode 2 shows an embodiment in which the duty cycle R1 of the first pulsed signal and the duty cycle R2 of the second pulsed signal vary as a function of the measured glare. In this example, the two variations are identical and the glare thresholds triggering a modification of the illumination are identical to those triggering a modification of the transmission coefficient, but it is envisionable for the variations to be independent without departing from the scope of the invention such as described above. The following behavior is then observed:

when there is "no glare", the duty cycle R1 and the duty cycle R2 are at their maximum: thus, the transparency of the variable transmission screen is at its maximum and the driver 24 benefits completely from his lights and from the exterior luminosity. Furthermore, the first pulsed signal that controls the illuminating device 22 has a lower amplitude than in Mode 1, so that the average illumination generated by the illuminating device 22 is the same as in Mode 1 over the period T.

when there is "high glare", the duty cycle R1 and the duty cycle R2 are in the same situation as in Mode 1 for the same glare level.

between these two extreme values, the duty cycle R1 and the duty cycle R2 vary gradually and/or in steps between their maximum and minimum values, depending on the magnitude of the measured glare. The amplitude of the first pulsed signal also varies as a function of the measured glare, advantageously so that the average illumination generated by the illuminating device 22 is the same over a period T whatever the measured glare. This makes it possible to preserve a constant average illumination and thus to meet regulations.

Mode 1 has the advantage of keeping the first pulsed signal constant, and therefore of avoiding the need to modify it as a function of the glare.

Mode 2 has the advantage of varying the power allocated to the illuminating device 22, and thus of optimizing the consumption of the electric current required by the system and its efficiency. Specifically, frequently used illuminating devices use light-emitting diodes (LEDs) and the power/luminosity ratio of the latter is not constant: increasing the supplied power by a factor of 2 does not generally lead to an increase in luminosity by a factor of 2. Thus, with Mode 2, excess consumption of electric current is avoided when no glare is measured.

During use of the device in Mode 2, the control unit 30 may send the first pulsed signal to the management circuit 32 and the second pulsed signal to the circuit 34 controlling the transmission coefficient, or indeed send the same pulsed signal to the management circuit 32 and to the circuit 34 controlling the transmission coefficient, the management circuit 32 being able to adjust the amplitude of the pulsed signal depending on the measured glare and the duty cycle R1.

Moreover, additional data processing will possibly allow variations in the glare to be detected. Thus, when the glare is measured to be getting higher and higher, the assisting device may anticipate its action on the transmission coefficient of the variable transmission screen F, 26, 28 in order to prevent the driver 24 from being dazzled. In other words, the assisting device will possibly take into account not only the value delivered by the glare sensor 46, but also its derivative.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A device for assisting with driving an automotive vehicle comprising:
    a variable transmission screen placed between a road scene (SR) and a driver of said vehicle;
    a control unit for generating signals to control a transmission coefficient of said variable transmission screen, said control unit controlling power supplied to said variable transmission screen that varies periodically between a maximum transmission coefficient when a transparency of said variable transmission screen is at a maximum and a minimum transmission coefficient when the transparency of said variable transmission screen is at a minimum;
    wherein said device further comprises a glare-evaluating means for sensing glare, said control unit being configured to modify said transmission coefficient of said variable transmission screen depending on said glare measured by said glare-evaluating means;
    wherein said vehicle being equipped with at least one illuminating device able to emit a beam for illuminating said road scene (SR) in front of said vehicle, said control unit is configured to, when active, control a light emission of at least one light source of said at least one illuminating device and said transmission coefficient of said variable transmission screen, in relation to each other;
    wherein said control unit is configured to, when active, control said light emission with a first periodic pulsed signal of period (T) and a first duty cycle (R1) and said transmission coefficient of said variable transmission screen with a second periodic pulsed signal of period (T) and a second duty cycle (R2), said device being configured to modify said coefficient of transparency of said variable transmission screen by modifying said second pulsed periodic signal so that said second duty cycle (R2) takes a value between:
    its maximum when said glare measured by said glare-evaluating means is below a first threshold; and
    said first duty cycle (R1) when said glare measured by said glare-evaluating means is above a second threshold.

2. The device as claimed in claim 1, wherein said control unit is configured to keep said first duty cycle (R1) constant whatever the value of said second duty cycle (R2).

3. The device as claimed in claim 1, wherein said control unit is configured to modify control of said light emission by modifying said first pulsed signal so that said first duty cycle (R1) takes a value between two extreme values:
    its maximum when said glare measured by said glare-evaluating means is below a third threshold; and
    its minimum when said glare measured by said glare-evaluating means is above a fourth threshold.

4. The device as claimed in claim 3, wherein said first duty cycle (R1) takes values identical to said second duty cycle (R2).

5. The device as claimed in claim 4, wherein said control unit is configured to modify control of said light emission by modifying an amplitude of said first pulsed signal.

6. The device as claimed in claim 3, wherein said control unit is configured to modify control of said light emission by modifying an amplitude of said first pulsed signal.

7. The device as claimed in claim 6, wherein said control unit is configured to modify control of said light emission by modifying said amplitude of said first pulsed signal so that the average illumination generated by said light emission during the period (T) is constant when said first duty cycle (R1) varies.

8. The device as claimed in claim 1, wherein said glare-evaluating means comprises a luminosity sensor, said device being configured to adapt glare thresholds to a measured luminosity.

9. The device as claimed in claim 1, wherein said glare-evaluating means is a luminosity sensor the measurements of which are processed in order to deduce said glare therefrom.

10. The device as claimed in claim 1 wherein said variable transmission screen comprises:
    a windshield of said vehicle;
    a screen placed between said windshield of said vehicle and said driver of said vehicle; or
    a pair of glasses worn by said driver of said vehicle.

11. The device as claimed in claim 1 wherein said variable transmission screen is formed by a pair of glasses worn by said driver of said vehicle, and wherein said glare-evaluating means is placed on said pair of glasses.

12. The device as claimed in claim 1, wherein said variable transmission screen comprises a pair of glasses.

13. A method for assisting with driving an automotive vehicle with a variable transmission screen placed between a road scene (SR) and a driver of said vehicle and at least one illuminating device able to emit a beam for illuminating said road scene (SR) in front of said vehicle, said method comprising the steps of:
    controlling a transmission coefficient of said variable transmission screen with a pulsed signal from a control unit;
    modifying said transmission coefficient of said variable transmission screen depending on glare measured by a glare sensor;
    wherein said control unit is configured to allow a light emission of at least one light source of said illuminating device and said transmission coefficient to be controlled in relation to each other;
    controlling said light emission of said at least one illuminating device with a first periodic pulsed signal of period (T) and a first duty cycle (R1) and said transmission coefficient of said variable transmission screen with a second periodic pulsed signal of period (T) and a second duty cycle (R2); and
    modifying said transmission coefficient of said variable transmission screen with a second periodic pulsed signal, so that said second duty cycle (R2) takes a value between:
    its maximum when said glare measured by said glare-evaluating means is below a first threshold; and
    said first duty cycle (R1) when said glare measured by said glare-evaluating means is above a second threshold.

14. The method as claimed in claim 13, wherein said first duty cycle (R1) is kept constant whatever the value of said second duty cycle (R2).

15. A method for assisting with driving an automotive vehicle with a variable transmission screen placed between a road scene (SR) and a driver of said vehicle and at least one illuminating device able to emit a beam for illuminating said road scene (SR) in front of said vehicle, said method comprising the steps of:
- controlling a transmission coefficient of said variable transmission screen with a pulsed signal from a control unit;
- modifying said transmission coefficient of said variable transmission screen depending on glare measured by a glare sensor;
- wherein said control unit is configured to allow a light emission of at least one light source of said illuminating device and said transmission coefficient to be controlled in relation to each other; and
- wherein allowing said light emission is performed by modifying an amplitude of a first periodic pulsed signal.

16. The method as claimed in claim 15, wherein said light emission is controlled by modifying said amplitude of said first periodic pulsed signal so that the average illumination generated by said light emission during the period (T) is constant when a first duty cycle (R1) varies.

* * * * *